United States Patent [19]

Siebert

[11] Patent Number: 4,992,181
[45] Date of Patent: Feb. 12, 1991

[54] WATER TREATMENT METHOD

[76] Inventor: Gerald H. Siebert, 4802 Black Rd., Monclova, Ohio 43542

[21] Appl. No.: 466,229

[22] Filed: Jan. 17, 1990

Related U.S. Application Data

[63] Continuation-in-part of Ser. No. 305,544, Feb. 3, 1989, abandoned.

[51] Int. Cl.$^5$ .............................................. C02F 1/74
[52] U.S. Cl. .................................... 210/744; 210/747; 210/763
[58] Field of Search ............... 210/664, 669, 721, 747, 210/763, 765, 758, 744, 257.1, 741, 739

[56] References Cited

U.S. PATENT DOCUMENTS

| | | | |
|---|---|---|---|
| 1,851,987 | 4/1932 | Schwab et al. | 210/758 |
| 3,111,983 | 11/1963 | Frank | 210/758 |
| 3,186,942 | 6/1965 | Benger | 210/763 |
| 3,387,431 | 6/1968 | Siebert | 55/51 |
| 3,672,836 | 6/1972 | Brown | 210/763 |
| 3,821,110 | 6/1974 | Luetzelschwab | 210/765 |
| 4,009,251 | 2/1977 | Meuly | 210/763 |
| 4,058,433 | 11/1977 | Fuller et al. | 210/758 |
| 4,097,201 | 6/1978 | Nussbaum | 417/360 |
| 4,264,451 | 4/1981 | Pope et al. | 210/763 |
| 4,455,236 | 6/1984 | Kim | 210/721 |
| 4,478,725 | 8/1984 | Velling et al. | 210/765 |
| 4,544,488 | 10/1985 | O'Brien | 210/669 |
| 4,696,749 | 9/1987 | Habromann et al. | 210/763 |
| 4,696,802 | 9/1987 | Bedell | 210/747 |
| 4,710,305 | 12/1987 | Allison et al. | 210/758 |
| 4,784,775 | 11/1988 | Hardison | 210/763 |
| 4,855,123 | 8/1989 | Suzuki et al. | 210/763 |

Primary Examiner—Peter Hruskoci
Assistant Examiner—Cynthia L. Messler
Attorney, Agent, or Firm—John C. Purdue; David C. Purdue

[57] ABSTRACT

A method for treating water removed from the ground is disclosed. The treatment reduces the content of noxious sulfur-containing impurities therein before the water is supplied to an associated water system. The method involves the steps of spraying the water to be treated in the upper portion of a standpipe, entraining air with the water which is sprayed in the upper portion of the standpipe, and maintaining a required water level in the standpipe. Spraying the water to be treated in the standpipe causes a flow of water from within the standpipe through a bed of a catalyst for the oxidation of sulfur and sulfur-containing moieties to sulfate anions and from the catalyst bed to the associated water system. The water level maintained in the standpipe is that required to enable the flow of water therefrom through the catalyst bed to the associated water system. The amount of air entrained with the water sprayed in the standpipe and the residence time of the water in the catalyst bed are controlled so that there is a substantially complete oxidation of sulfur and sulfur-containing moieties to sulfate anions before the water is delivered to the associated water system. Water may be supplied to the standpipe from a vessel in which the water has been aerated by spraying the water upwardly in the vessel.

20 Claims, 2 Drawing Sheets

WATER TREATMENT METHOD

REFERENCE TO RELATED APPLICATION

This is a continuation-in-part of application Ser. No. 305,544 filed Feb. 3, 1989 now abandoned.

ABBREVIATIONS

As used herein and in the appended claims, "psig" means pounds per square inch gauge, "ppm" means parts per million by weight and MPa means $10^6$ Pascals.

FIELD OF THE INVENTION

This invention relates to an aeration method for treating water and, more specifically, to an aeration method for treating potable water to reduce the content of noxious sulfur-containing impurities therein.

BACKGROUND OF THE INVENTION

Noxious sulfur containing impurities which occur in varying amounts in underground water in many parts of the country can be removed by chlorination and are removed spontaneously if the water is allowed to stand, for example in ponds or in open vessels. Chlorination is a comparatively unsatisfactory technique, particularly for a small water system, because it is necessary to analyze the water on a regular basis and to add just enough chlorine for reaction with the sulfur impurities without any appreciable excess. The regular analysis is necessary because the content of the sulfur-containing impurities varies from time to time. Spontaneous removal of sulfur impurities from ponds or open vessels is also an unsatisfactory technique because of the danger of contamination of the water during standing either in a pond or in an open vessel.

Aeration of water to remove noxious sulfur impurities therefrom has also been suggested, for example, by "Nussbaum", U.S. Pat. No. 4,097,201 and by "Siebert", U.S. Pat. No. 3,387,431. Finally, the use of redox resin to oxidize hydrogen sulfide dissolved in waste water to sulfur, and removal of the sulfur by filtration is suggested by "Kim", U.S. Pat. No. 4,455,236.

SUMMARY OF THE INVENTION

The instant invention is based upon the discovery of a method for aerating water as it is pumped from the ground; the method has been found to be remarkably effective at eliminating noxious sulfur compounds from the water, some of which can be vented to the atmosphere and some of which can be converted to an unobjectionable form. The method comprises the steps of spraying the water to be treated in the upper portion of a standpipe, upon demand from an associated water system, to cause a flow of water from within the standpipe through a bed of a catalyst for the oxidation of sulfur-containing moieties to sulfate anions, and from the catalyst bed to the associated water system, entraining air with the water sprayed in the standpipe, and maintaining the water level in the standpipe that is required to enable the flow of water and entrained air therefrom to pass through the catalyst bed and to the associated water system. The method can be practiced in apparatus comprising a standpipe, a first line operably connecting the standpipe, near its bottom, to a vessel containing a catalyst bed, and means connecting the vessel containing the catalyst bed to the associated water system, and a second line constituting an inlet to the first line from a given level in the standpipe. When the method is practiced in such apparatus, a predetermined water level can be maintained in the standpipe by causing air, water or both to flow from the given level in the standpipe through the second line and into the first line for entrainment by and flow with the water flowing therethrough to the vessel containing the catalyst bed and to the associated water system. Preferably, particularly when the sulfur content of the water to be treated is comparatively high, the water is pumped from the ground into a vessel to maintain a predetermined level of water in the vessel; air is entrained with the water pumped into the vessel; and gas is vented from a location within the vessel that is above the predetermined level. Preferably, water pumped into the vessel is sprayed upwardly therein to entrain air in the water. Water and entrained air, then, are pumped, upon demand from the associated water system, from a location within the vessel that is below the predetermined level into the air space in the standpipe. Excellent results have been achieved using activated carbon as the catalyst for the oxidation of sulfur-containing moieties to sulfate anions, and it has been found that green sand (also called zeolites), transition metals and oxides of transition metals are also operable.

DETAILED DESCRIPTION OF THE INVENTION

Figure 1:
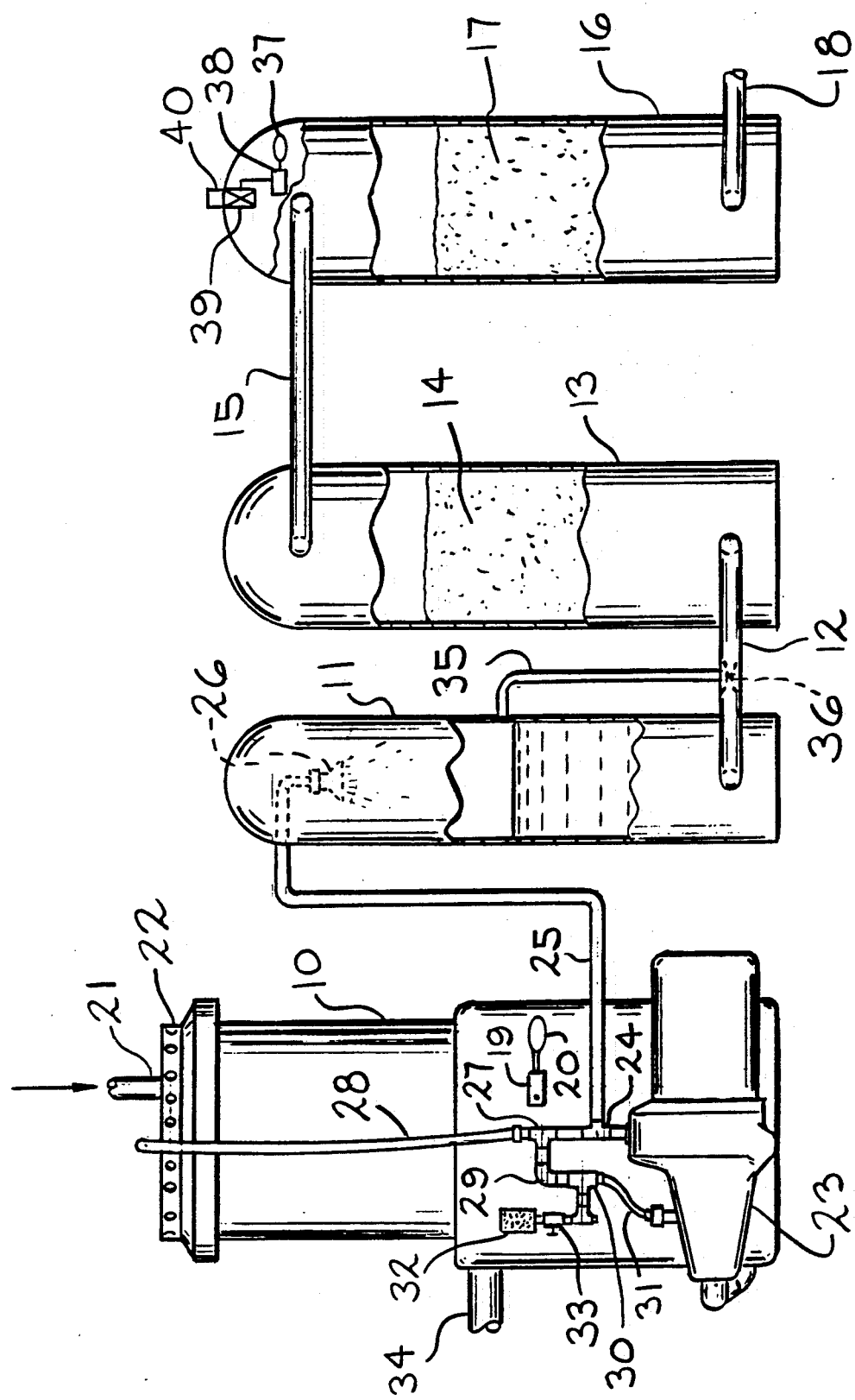
FIG. 1 is a schematic diagram showing apparatus in which the method of the instant invention is practiced.

The instant invention is a method which is practiced in the apparatus of FIG. 1, attached, which comprises a vessel 10, a standpipe 11, which is operably connected by a cross line 12 to a vessel 13 which contains a fluidized bed 14 of activated carbon. The vessel 13 is connected by a cross line 15 to a vessel 16 which contains a green sand or zeolite filter 17. The vessel 16 is operably connected to a line 18 which is a part of an associated water system (not illustrated). A downwell pump (not illustrated) in a well (not illustrated) is energized by a switch 19 which is actuated by a float 20 in the vessel 10 to cause water to flow through an inlet 21 into the vessel 10 as required to maintain a predetermined water level therein. Water flowing through the inlet 21 induces a flow of air into the vessel 10 through an air inlet filter 22, causing an initial aeration of the water.

A pump 23 associated with the vessel 10 is energized as required to maintain a given pressure, say 40 psig (about ¼ MPa), in the standpipe 11, in essence, operating upon demand from the associated water system. Aerated water discharged by the pump 23 flows upwardly to a T 24 from which a part flows through a line 25 to a nozzle 26 and is sprayed inside the standpipe 11 while another part flows upwardly to a T 27. A part of the aerated water which reaches the T 27 flows upwardly through a recycle line 28 from which it is sprayed in the vessel 10 while the rest flows through a line 29, a T 30, and a line 31 to the suction side of the pump 23. Water flowing through the T 30 passes through a venturi therein, inducing a flow of air through a filter 32 and into the T 30 where it mixes with the water and flows therewith into the suction side of the pump 23. The position of a valve 33 controls the amount of air which flows through the filter 32 and into the T 30 for mixture with the water and flow therewith into the suction side of the pump 23. It is, thus, a mixture of aerated water from the line 31 and aerated water from the vessel 10 that is delivered by the pump 23 to the T 24.

Sulfur-containing gases that are released inside the vessel 10 can escape therefrom through a vent 34, thus preventing a build-up.

As is stated above, aerated water discharged by the pump 23 is sprayed from the nozzle 26 as required to maintain a predetermined pressure inside the standpipe 11. A line 35 connects the interior of the standpipe 11 with a venturi 36 in the line 12. Water flowing through the line 12 from the standpipe 11 to the vessel 13 passes through the venturi 36, inducing a flow of air, water or both from inside the standpipe 11 through the line 35 and into the venturi 36. As a consequence, the water level within the standpipe 11 is maintained at about the height of the opening therefrom into the line 35.

Water which enters the vessel 13 after flowing through the line 12, flows upwardly through the fluidized bed 14 of activated carbon, through the cross line 15 into the vessel 16, downwardly through the greensand or zeolite filter 17, and then through the line 18 into the water system (not illustrated) which is served. Whenever the water level in the vessel 16 is below a predetermined level, a float 37 therein closes a switch 38, causing a valve 39 in a gas vent 40 to open; gas, essentially air which entered the vessel 16 entrained in water, is then vented until the predetermined water level is restored and the float 37 opens the switch 38.

Excellent results have been achieved when the standpipe 11 and the vessels 13 and 16 were so sized that the residence times therein were as short as 30 seconds, 78 seconds and 49 seconds, respectively. It will be appreciated that longer residence times can be used without detriment, and that all that is required is for there to be sufficient time, preferably at least about 100 seconds, after the aerated water enters the standpipe 11 and before it flows through the line 18 to the associated water system.

Water which contains as much as 60 ppm sulfur has been treated as previously described, with residence times in the standpipe 11 and in the vessels 13 and 16 as short as those stated above, to accomplish complete elimination of noxious taste and odor when the residence time in the vessel 10 was as short as 120 seconds and the capacity of the pump 23 in cubic meters per minute was about 44 percent of the volume, in cubic meters, of water in the vessel 10; about half of the effluent from the pump 23 flowed through the line 25 to the nozzle 26, while about one fourth flowed through the recycle line 28 and about one fourth flowed through the line 31 to the suction side of the pump 23. It will be appreciated that the treatment involves release of dissolved sulfur-containing gases in the vessel 10, and venting of the released gases, followed by a period during which the aerated water flows through the standpipe 11, the vessel 13 and the vessel 16. It has been found that the water flowing through the line 25 may still have a noxious taste and odor, but that these are eliminated as the water flows through the rest of the apparatus. It is believed, although the instant invention is not to be construed as limited in any way by the explanation which follows, that dissolved sulfur-containing gases, particularly $H_2S$, are removed from the water in the vessel 10 and discharged from the system through the vent 34, while the remaining sulfur is oxidized, particularly in the activated carbon bed 14, forming sulfate anions. It has also been found that the vessel 10 is not required when waters containing not more than 20 ppm sulfur are being treated, as satisfactory results can be achieved by pumping water directly from the down well pump (not illustrated) through a dispersing venturi (not illustrated) and to the nozzle 26 in the standpipe 11, while pumping air under a suitable pressure into the dispersing venturi to accomplish thorough aeration of the water delivered to the nozzle 26. The complete oxidation of sulfur to sulfate anions requires about 2 ppm oxygen for 1 ppm sulfur, and it is usually desirable that at least a 10 percent excess of oxygen be present.

Figure 2:
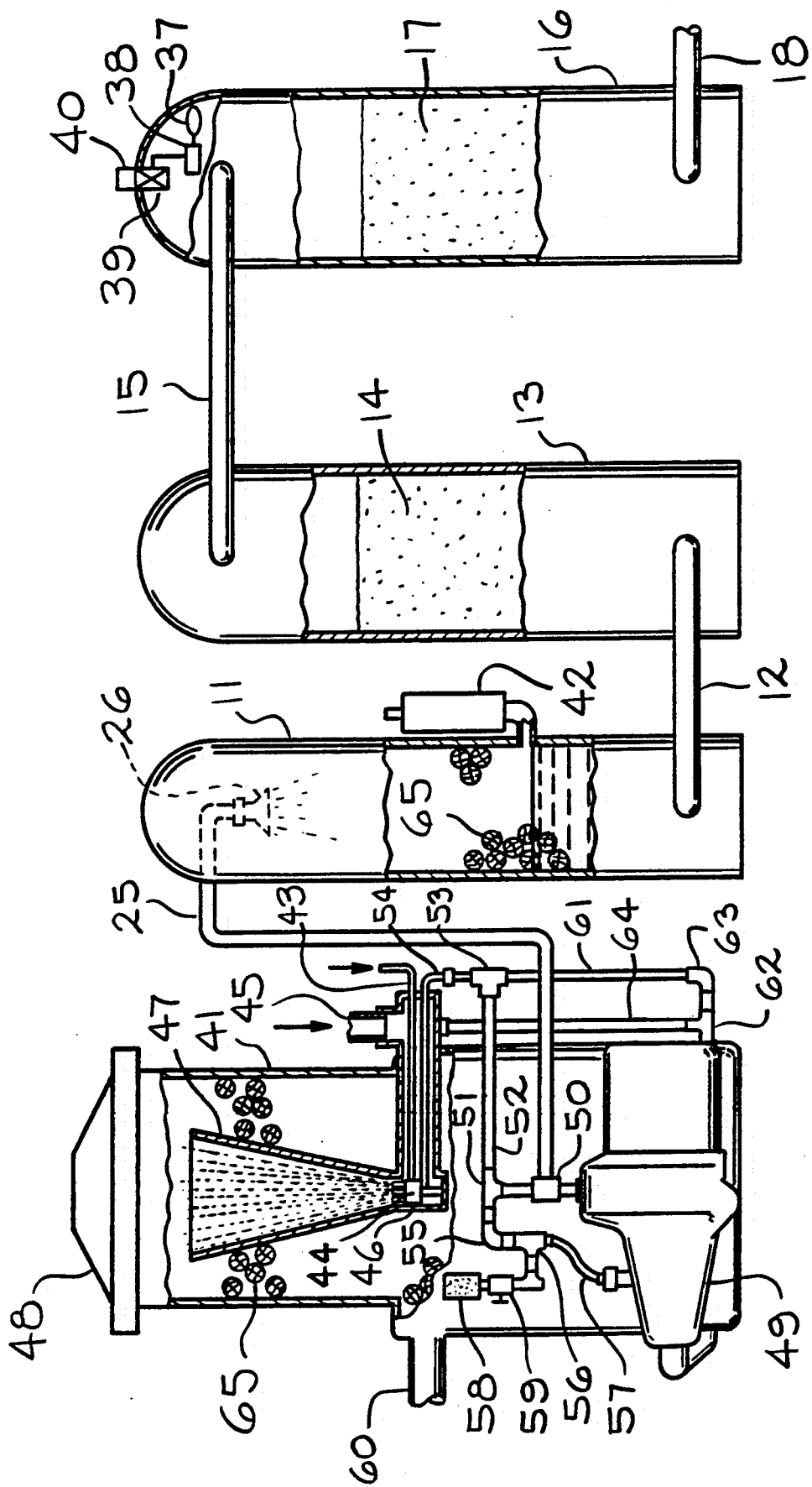
FIG. 2 is a schematic diagram showing a second embodiment of apparatus in which the method of the instant invention is practiced.

Referring now to FIG. 2, there is illustrated apparatus corresponding with the apparatus illustrated in FIG. 1, except the vessel 10 has been replaced by a vessel 41 and the line 35 from the standpipe 11 has been replaced with an air release device 42. A downwell pump (not illustrated) in a well (not illustrated) is energized to cause water to flow through an inlet 43 into the vessel 41, as required, to maintain a predetermined water level therein. Water flowing through the inlet 43 is delivered to a nozzle device 44 through which the water is discharged, upwardly, in the vessel 41.

The nozzle device 44 may have six nozzles. Good results have been obtained with a nozzle device having six spray heads wherein feed water from a well was delivered to five of the nozzles and, as described below, aerated recycled water from the vessel 41 was delivered to the sixth spray head. Other arrangements for the nozzle device can be expected to give good results, too.

Fresh air is induced to flow through an air inlet 45 which is in communication with a lower portion 46 of a spray cone 47 in which the nozzle 44 is located. Water discharged upwardly from the nozzle 44 induces a relatively large quantity of air to flow into the spray cone 47, through the air inlet 45, where it is mixed with the sprayed water. Water discharged from the nozzle 44 mixes with the fresh air, strikes the inside surface of a dome-shaped top 48 of the vessel 41 and falls toward the bottom of the vessel 41, either along the inside surface of the walls of the vessel 41 or between the walls of the vessel 41 and the outside of the spray cone 47. Column packing material 65 may be used to promote or accelerate the aeration of feed water in the vessel 41. For example, Jaeger Tri-Packs ® column packing balls may be supported in the upper region of the vessel 41, outside of the spray cone 47. Such column packing balls are available from Jaeger Products, Inc., in Spring Texas, although any high surface area packing material will promote aeration of the water sprayed in the vessel 41 and further reduce the hydrogen sulfide content of that water. It is contemplated that one or more catalysts for the oxidation of sulfur-containing moieties to sulfate anions may be provided on such column packing materials to promote oxidation in the vessel 41. Such column packing material 65 may be supported in the upper region of the standpipe 11 and catalyst material may be used to promote oxidation in the standpipe 11. Very good results are obtained, however, without the use of column packing materials. It is further contemplated that the use of column packing material, including a catalyst, in the vessel 41, the standpipe 11, or both, may obviate the use of the vessel 13 and contents, the vessel 16 and contents, or both.

A pump 49 associated with the vessel 41 is energized as required to maintain a given pressure, say 40 psig (about ¼ MPa), in the standpipe 11, in essence, operating upon demand from the associated water system. Water discharged by the pump 49 flows upwardly to a T 50 from which a part flows through the line 25 to the nozzle 26 and is sprayed inside the standpipe 11, while another part of the water flows upwardly to a T 51. A part of the water which reaches the T 51 flows through a recycle line 52, through a T 53, through a recycle line 54 to the nozzle 44 from which it is sprayed upwardly in the vessel 41, while the rest of the water which reaches the T 51 flows through a line 55, a T 56, and a line 57 to the suction side of the pump 49 for recirculation. Water flowing through the T 56 passes through a venturi therein, inducing a flow of air through a filter 58 and into the T 56 where it mixes with the water and flows therewith into the suction side of the pump 49. The position of a valve 59 controls the amount of air which flows through the filter 58 and into the T 56 for mixture with the water and flow therewith into the suction side of the pump 49. It is, thus, a mixture of aerated water from the line 57 and aerated water from the vessel 41 that is delivered by the pump 49 to the T 50. Sulfur-containing gases that are released inside the vessel 41 can escape therefrom through a vent 60, thus preventing a build-up.

A recycle line 61 is connected to the T 53. A stream of water from the vessel 41 flows from the vessel 41, through a T 62, through an elbow including an air bubbler venturi 63, through the line 61, through the T 53, through the line 54 and to the nozzles 44. The flow of water through the venturi 63 induces a flow of fresh air to flow through the inlet 45, through a line 64, through the T 62 and through the venturi 63 where it aerates the water drawn from the vessel 41 into the venturi 63 and the mixture of air and water is delivered to the nozzle 44 through the recycle line 54.

As is stated above, some of the aerated water discharged by the pump 49 is sprayed from the nozzle 26 as required to maintain a predetermined pressure inside the standpipe 11. An air release device 42 is provided on the standpipe 11 so that the water level within the standpipe 11 is maintained at about the height of the opening therefrom into the air release device 42. Water flows through the line 12 from the standpipe 11 to the vessel 13, but, in this embodiment, there is no venturi in the line 12.

It will be apparent that various changes and modifications can be made from the details of the instant invention as shown in the attached drawing and described in connection therewith without departing from the spirit and scope thereof as defined in the appended claims.

I claim:

1. A method for treating water removed from the ground to reduce the content of noxious sulfur-containing impurities therein before the water is supplied to an associated water system, said method comprising the steps of spraying the water to be treated in the upper portion of a closed standpipe which has an inlet for the water to be treated and an outlet through which water can flow from the standpipe into a closed tank containing a bed of a catalyst for the oxidation of sulfur and sulfur-containing moieties to sulfate anions, the inlet and the outlet of the standpipe being so positioned that air which becomes disassociated from water can collect in the upper portion of the standpipe, and the closed tank being operably connected for the flow of water which has flowed through the catalyst bed therein into the associated water system, controlling the spraying of water in the upper portion of the closed standpipe to maintain a superatmospheric pressure therein to pressurize the associated water system, entraining air with the water before it is sprayed in the standpipe, maintaining the water level in the standpipe that is required to enable the flow of water therefrom through the catalyst bed to the associated water system, and controlling the amount of air entrained with the water sprayed in the standpipe and the residence time of the water in the catalyst bed so that entrained air separates from the water and forms an air pocket inside the standpipe and there is a substantially complete oxidation of sulfur and sulfur-containing moieties to sulfate anions.

2. A method as claimed in claim 1 wherein the required water level is maintained in the standpipe by inducing water, air or both to flow from the required level within the standpipe whenever water is flowing from the standpipe to the catalyst bed, and mixing the water, air or both so induced to flow with the water flowing from the standpipe to the catalyst bed.

3. A method as claimed in claim 1 wherein, prior to said spraying step, the water removed from the ground is first introduced in to a vessel as required to maintain a predetermined water level in the vessel, air is entrained with the water introduced into the vessel, and the water sprayed in the standpipe is pumped from a point in the vessel below the predetermined level.

4. A method as claimed in claim 3 which additionally includes the step of entraining air from above the predetermined level within the vessel with the water and entrained air pumped from the location below the predetermined level in the vessel through the inlet and into the standpipe.

5. A method as claimed in claim 3 which additionally includes the step of venting gas and vapor from a point in the vessel above the predetermined level.

6. A method as claimed in claim 3 wherein a portion of the water that is pumped from a point in the vessel below the predetermined level is sprayed in the standpipe while another portion is returned to the suction side of the pump.

7. A method as claimed in claim 3 wherein a portion of the water that is pumped from a point in the vessel below the predetermined level is sprayed in the standpipe while another portion is returned to the suction side of the pump, and which additionally includes the step of entraining air from above the predetermined level within the vessel with the portion of the water and entrained air pumped from the location below the predetermined level and returned to the suction side of the pump.

8. A method as claimed in claim 3 wherein the step of entraining air with the water introduced into the vessel includes the step of spraying water to be treated upwardly within the vessel.

9. The method claimed in claim 8 wherein a combination of water from within the vessel and water from the ground are sprayed upwardly in the vessel at the same time.

10. A method as claimed in claim 1 wherein, prior to said spraying step, the water removed from the ground is first introduced into a vessel as required to maintain a predetermined water level in the vessel, air is entrained with the water introduced into the vessel as the water so introduced is sprayed upwardly in the vessel inducing a flow of air for entrainment with that water, and the water sprayed in the standpipe is pumped from a point in the vessel below the predetermined level.

11. A method as claimed in claim 10 which additionally includes the step of venting gas and vapor from a point in the vessel above the predetermined level.

12. A method as claimed in claim 10 wherein a portion of the water that is pumped from a point in the vessel below the predetermined level is sprayed in the standpipe while another portion is returned to the suction side of the pump.

13. A method as claimed in claim 10 wherein a portion of the water that is pumped from a point in the vessel below the predetermined level is sprayed in the standpipe while another portion is returned to the suction side of the pump, and which additionally includes the step of entraining air from above the predetermined level within the vessel with the portion of the water and entrained air pumped from the location below the predetermined level and returned to the suction side of the pump.

14. A method for treating water removed from the ground to reduce the content of noxious sulfur-containing impurities therein before the water is supplied to an associated water system, said method comprising the steps of spraying the water to be treated in the upper portion of a closed standpipe which has an inlet for the water to be treated and an outlet through which water can flow to the associated water system, the inlet and the outlet of the standpipe being so positioned that air which becomes disassociated from water can collect in the upper portion of the standpipe, controlling the spraying of water in the upper portion of the closed standpipe to maintain a superatmospheric therein to pressurize the associated water system, entraining air with the water before it is sprayed in the standpipe, said last named step being carried out in a vessel in which the ground water is sprayed upwardly, maintaining the water level in the standpipe that is required to enable the flow of water therefrom to the associated water system, containing the ground water, before it is delivered to the associated water system, with a catalyst for the oxidation of sulfur and sulfur-containing moieties to sulfate anions, and controlling the time of contact between the ground water and the catalyst, the amount of air entrained with the water sprayed in the vessel and the amount of air entrained with the water sprayed in the standpipe so that entrained air separates from the water and forms an air pocket inside the standpipe and there is a substantially complete oxidation of sulfur and sulfur-containing moieties to sulfate anions.

15. The method claimed in claim 14 wherein at least some of the catalyst is supported on column packing means provided in the vessel.

16. The method claimed in claim 14 wherein at least some of the catalyst is supported on column packing means provided in the standpipe.

17. The method claimed in claim 14 wherein at least some of the catalyst is supported on column packing means provided in the vessel and column packing means provided in the standpipe.

18. The method claimed in claim 14 wherein ground water is introduced into the vessel as required to maintain a predetermined water level in the vessel and the water sprayed in the standpipe is pumped from a point in the vessel below the predetermined level.

19. The method as claimed in claim 18 wherein a portion of the water that is pumped from a point in the vessel below the predetermined level is sprayed in the standpipe while another portion is returned to the suction side of the pump.

20. The method as claimed in claim 18 wherein a portion of the water that is pumped from a point in the vessel below the predetermined level is sprayed in the standpipe while another portion is returned to the suction side of the pump, and which additionally includes the step of entraining air from above the predetermined level within the vessel with the portion of the water and entrained air pumped from the location below the predetermined level and returned to the suction side of the pump. the pump, and which additionally includes the step of entraining air from above the predetermined level within the vessel with the portion of the water and entrained air pumped from the location below the predetermined level and returned to the suction side of the pump.

* * * * *